No. 876,081. PATENTED JAN. 7, 1908.
G. H. ORR.
NUT LOCK.
APPLICATION FILED SEPT. 3, 1907.

Witnesses.
Robt B Wilson
M. S. Smith

Inventor.
George Herbert Orr.

UNITED STATES PATENT OFFICE.

GEORGE HERBERT ORR, OF TOLEDO, OHIO.

NUT-LOCK.

No. 876,081.   Specification of Letters Patent.   Patented Jan. 7, 1908.

Application filed September 3, 1907. Serial No. 391,236.

*To all whom it may concern:*

Be it known that I, GEORGE HERBERT ORR, a citizen of the United States, residing at Toledo, in the county of Lucas and State of Ohio, have invented a new and useful Nut-Lock, of which the following is a specification.

My invention relates to improvements in locking devices in which it is sought to lock a nut, cone, cup, or other body working on a threaded surface in a permanent and fixed position; and the objects of my improvement are:—1st., to permit of the tight locking of a nut or other threaded body against the object which it is to hold in place. 2nd., to adjustably lock a nut or other threaded body in a fixed position so that it will not work loose, and at the same time permit of an easy subsequent adjustment to take up wear or play in the parts to be held in place. 3rd., to lock a nut or other threaded body in a fixed position so that it may neither move forward nor backward; thus adapting it to be used as a shoulder or stop for bearings, journals, or the like. 4th., to provide a locking device which does not impair in any way the threads in engagement with the nut or other threaded body to be locked. 5th., to permit the removing, replacing or altering in position, of the nut or other threaded body, easily and without damage to any of its parts. I attain these objects by the construction and combination of parts hereinafter described and illustrated in the accompanying drawings, in which:—

Figure 1:
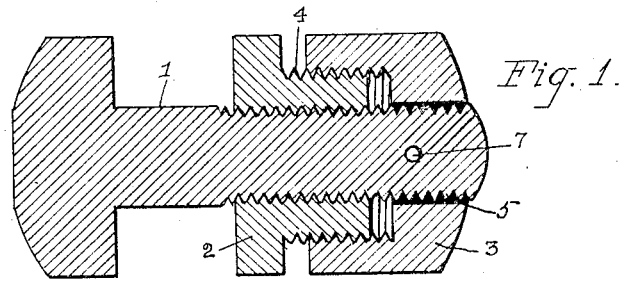
Figures 2, 5:
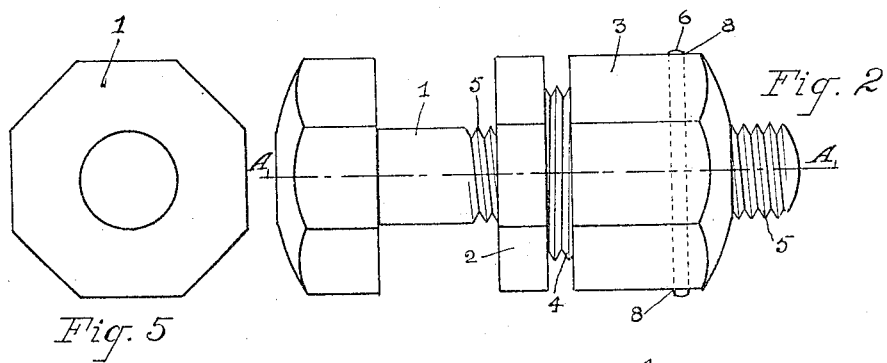
Figure 3:
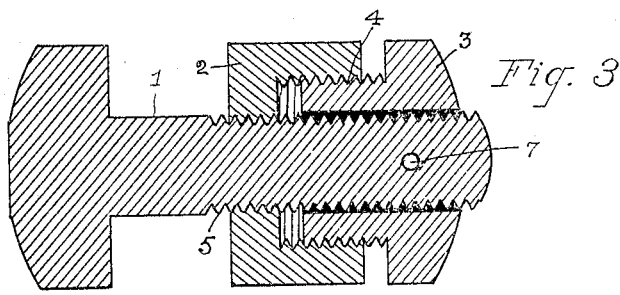
Figure 4:
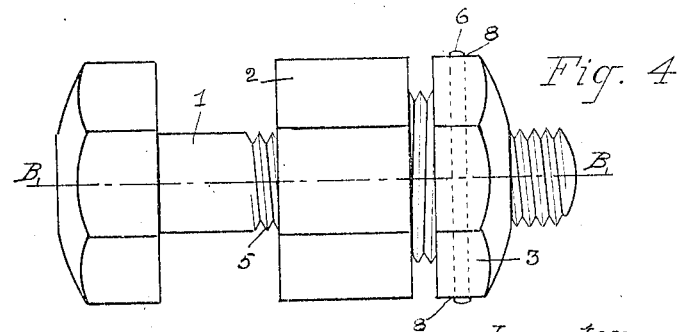

Figure 1 is a view in longitudinal section, on line A—A of Fig. 2, of a bolt having mounted thereon a sectional nut constructed in accordance with my invention. Fig. 2 is a view in side elevation of the same. Fig. 3 is a view in longitudinal section, on line B—B of Fig. 4, of a bolt having mounted thereon a modified form of sectional nut constructed in accordance with my invention. Fig. 4 is a view in side elevation of the same, and Fig. 5 is an end view of the head of the bolt.

In the drawings 1 designates a screw threaded bolt, such as is usual in machine practice. This bolt has a right hand thread 5, and is provided with a diametric key opening 7, for the reception of a pin or key 6.

Upon the bolt 1 there is threaded a sectional nut, comprising the inner section 2, and the outer section 3. The inner section 2 has a portion with squared faces for the use of a wrench and an outer cylindrical portion provided with a left hand thread 4.

Section 3 is preferably provided with squared faces for the use of a wrench, and has an outer end portion with an axial bore permitting it to pass over and not engage the thread of the bolt and an inner end portion threaded to engage the outer cylindrical portion of section 2. The squared faces upon section 2 and 3 are not an essential part of my invention.

Through the outer portion having the axial bore, the section 3 is provided with a diametric key opening 8 adapted to be brought into register with the opening 7 of the bolt 1 to permit the insertion of the pin or key 6.

Thus constructed the operation of my invention is as follows:—The section 2 carrying the section 3 fully engaged upon it, is screwed up on the bolt 1, until the nut is tight against the object to be held. The section 3 is then unscrewed on the thread 4, and owing to the difference in the direction of the threads 4 and 5, the tendency of this unscrewing is to still further tighten the section 2 against the object, until the key openings 8 in the section 3 register with the key opening 7 in the bolt 1, at which time the key 6 is inserted through said openings 7 and 8, and the parts are thereby locked against any rotation. As the outer section 3 is held immovable on the bolt by the key 4, the inner section 2 is held immovable by the opposition of its threads 4 and 5, and cannot move either forward or backward, as any tendency to move in either direction on the one thread would be counteracted by a tendency to move in the opposite direction on the other thread.

In Figs. 3 and 4 are shown a modified form of sectional nut constructed in accordance with my invention. The operation of this modified form is the same as heretofore described.

It is obvious that the section 2 may be placed in position and that the section 3 may thereafter be brought into position by passing it over the bolt and screwing it up on the section 2, until the key openings are in register, although the method first set forth is preferable.

The sections of the nut and the bolt are to be designed for a certain range of adjustment, suited to the requirements of the work; the lengths of the threaded portion of section 3 and of that corresponding to it in section 2 determining said range of adjustment; the dimensions of said sections are to be such that several of said threads will remain engaged when the nut is locked.

It is apparent also that the same principles of construction may be used for locking of a cone, cup, or other threaded body, on a threaded surface, in any position that may be desired and I therefore do not limit myself to the application of my invention as shown and described.

While the outer end portion of section 2 is preferably threaded reversely to the thread on the bolt, it is manifest that if said outer end portion is provided with any thread such that the engagement of section 2 on both the thread of the bolt and the thread of the inner end portion of the outer section would cause an interference of said threads to the revolving of section 2, a locking of the parts will result when the key is inserted, sufficient to prevent the rotation of said section. I therefore do not limit myself in the construction of my invention to the use of an inner section having one portion reversely threaded with respect to the other.

What I claim to be new is:—

1. The combination with a threaded body, of a sectional nut comprising an inner section having an interior thread to run on the threaded body and an outer end portion threaded so that the threads cross over without engaging the threads of the threaded body, an outer section having an axial bore permitting it to pass over and not engage the threaded body, and an inner end portion threaded to engage the threaded portion of the outer end of the inner section, and means to lock the outer section of said nut to the threaded body.

2. In a nut-lock, the combination with a threaded bolt, of a sectional nut comprising an inner section interiorly threaded to run on the thread of the bolt and an outer end portion having an outer thread crossing over but not engaging the threads of the bolt, an outer section having an axial bore permitting it to pass over and not engage the threaded portion of the bolt and having an inner end portion threaded to engage the threads of the outer end portion of the inner section; and means to lock the outer section of said nut to said bolt.

3. In a nut-lock, the combination with a threaded bolt of a sectional nut comprising an inner section interiorly threaded to run on the thread of the bolt and having an outer portion reversely threaded with respect to its interior thread, and an outer section having an axial bore permitting it to pass over and not engage the threaded portion of the bolt and having an inner end portion threaded to engage the outer threaded portion of the inner section; and means to lock the outer section of said nut to said bolt.

4. In a nut-lock, the combination with a threaded bolt, of a sectional nut comprising an inner section interiorly threaded to run on the thread of the bolt, and having a reduced outer end portion exteriorly and reversely threaded with respect to its interior thread, an outer section having an outer end portion with an axial bore permitting it to pass over and not engage the threaded portion of the bolt, and a counterbored inner end portion threaded to run on the exterior thread of the inner section; and means to lock the outer section of said nut to said bolt.

5. In a nut-lock, the combination of a threaded bolt having a diametric key opening, of a sectional nut comprising an inner section interiorly threaded to run on the thread of the bolt and having an outer portion reversely threaded with respect to its interior thread and an outer section having an axial bore permitting it to pass over and not engage the threaded portion of the bolt and an inner end portion threaded to engage the outer threaded portion of the inner section; said outer end portion of the outer section having diametric key openings adapted to be brought into register with the key opening of the bolt, and a key adapted to be inserted through the key openings of the nut and bolt when they are in register, substantially as described.

6. In a nut-lock, the combination with a threaded bolt having a diametric key opening, of a sectional nut comprising an inner section interiorly threaded to run on the thread of the bolt, and having a reduced outer end portion exteriorly and reversely threaded with respect to its interior thread, an outer section having an outer end portion with an axial bore permitting it to pass over and not engage the threaded portion of the bolt, and a counterbored inner end portion threaded to run on the exterior thread of the inner section; said outer end portion of said outer section having diametric key openings adapted to be brought into register with the key opening of the bolt, and a key or pin adapted to be inserted through the key openings of the nut and bolt when in register, the whole substantially as shown and described.

GEORGE HERBERT ORR.

Witnesses:
 MABEL MARIE MAEDER,
 BERTRAND FERDINAND GOULD.